(12) United States Patent
Chiu et al.

(10) Patent No.: US 11,448,791 B2
(45) Date of Patent: Sep. 20, 2022

(54) MARINE DETERMINISTIC NOTCH COMPENSATION

(71) Applicant: CONOCOPHILLIPS COMPANY, Houston, TX (US)

(72) Inventors: Stephen K. Chiu, Katy, TX (US); Joel D. Brewer, Sealy, TX (US); Peter M. Eick, San Antonio, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 964 days.

(21) Appl. No.: 16/123,763

(22) Filed: Sep. 6, 2018

(65) Prior Publication Data

US 2019/0011589 A1 Jan. 10, 2019

Related U.S. Application Data

(63) Continuation of application No. 14/817,718, filed on Aug. 4, 2015, now Pat. No. 10,101,479.

(60) Provisional application No. 62/037,197, filed on Aug. 14, 2014.

(51) Int. Cl.
*G01V 1/36* (2006.01)

(52) U.S. Cl.
CPC .............. *G01V 1/364* (2013.01); *G01V 1/362* (2013.01); *G01V 2210/1423* (2013.01); *G01V 2210/322* (2013.01); *G01V 2210/324* (2013.01); *G01V 2210/56* (2013.01)

(58) Field of Classification Search
CPC ............... G01V 1/364; G01V 1/362; G01V 2210/1423; G01V 2210/322; G01V 2210/324; G01V 2210/56
See application file for complete search history.

(56) References Cited

U.S. PATENT DOCUMENTS

| 4,458,342 A | 7/1984 | Tournois |
| 2005/0265122 A1* | 12/2005 | Grion .................... G01V 1/364 367/21 |
| 2009/0213691 A1 | 8/2009 | Christie |
| 2010/0074049 A1 | 3/2010 | Kragh |

(Continued)

OTHER PUBLICATIONS

International Search Report, PCT/US2015/043643, dated Oct. 16, 2015, 2 pgs.

*Primary Examiner* — Krystine E Breier
(74) *Attorney, Agent, or Firm* — ConocoPhillips Company

(57) ABSTRACT

A method of performing notch compensation and a system to perform notch compensation for a first seismic streamer are described. The method includes disposing the first seismic streamer at a first depth, where the seismic streamer includes a first set of sensors to receive reflections resulting from a seismic source, the reflections indicating a notch at a frequency. The method also includes disposing a second seismic streamer at a second depth, the second depth being less than the first depth and the second seismic streamer including a second set of sensors to receive reflections resulting from the seismic source. The method further includes processing the reflections received by the first set of sensors and the second set of sensors together to derive the match filter, and applying the match filter to the reflections received by the first set of sensors of the first seismic streamer to compensate for the notch.

16 Claims, 5 Drawing Sheets

(56) References Cited

U.S. PATENT DOCUMENTS

| | | | |
|---|---|---|---|
| 2010/0135112 A1* | 6/2010 | Robertsson | G01V 1/38 |
| | | | 367/24 |
| 2010/0286921 A1 | 11/2010 | Lee | |
| 2012/0218859 A1 | 8/2012 | Soubaras | |
| 2013/0135966 A1 | 5/2013 | Rommel | |
| 2013/0282292 A1 | 10/2013 | Wang | |
| 2014/0019055 A1* | 1/2014 | Kustowski | G01V 1/364 |
| | | | 702/14 |
| 2014/0064027 A1 | 3/2014 | Winnett | |

* cited by examiner

MARINE DETERMINISTIC NOTCH COMPENSATION

CROSS-REFERENCE TO RELATED APPLICATIONS

This application is a continuation application which claims benefit under 35 USC § 120 to U.S. application Ser. No. 14/817,718 filed Aug. 4, 2015, entitled "MARINE DETERMINISTIC NOTCH COMPENSATION," which claims benefit under 35 USC § 119(e) to U.S. Provisional Application Ser. No. 62/037,197 filed Aug. 14, 2014, entitled "MARINE DETERMINISTIC NOTCH COMPENSATION," which is incorporated herein in its entirety.

FIELD OF THE INVENTION

This invention generally relates to seismic streamers towed by a vessel in a marine environment. In particular, embodiments detail compensation for a notch filter in receivers arranged along the seismic streamers.

BACKGROUND OF THE INVENTION

Seismic streamers are towed by a vessel in a marine environment such as an ocean. Each seismic streamer includes a series of the geophones or hydrophones (receivers) that receive the seismic signals and convert them into electrical or other signals. The receivers arranged along the seismic streamers record seismic signals resulting from a reflection of a seismic source signal transmitted into the underwater environment below the seismic streamers. The seismic source signal may originate from the vessel, for example. The seismic streamers extend behind the vessel and can be several kilometers in length. Thus, the seismic streamers are unlikely to be linear but, instead, have shapes affected by factors like wind speed, direction, and marine current, for example. The seismic streamers are typically fashioned with the receivers arranged at regular intervals along each streamer.

SUMMARY OF THE INVENTION

According to an embodiment, a method of performing notch compensation for a first seismic streamer includes disposing the first seismic streamer at a first depth, the seismic streamer comprising a first set of sensors configured to receive reflections resulting from a seismic source, the reflections received by the first set of sensors indicating a notch at a frequency; disposing a second seismic streamer at a second depth, the second depth being less than the first depth and the second seismic streamer comprising a second set of sensors configured to receive reflections resulting from the seismic source; processing the reflections received by the first set of sensors and the second set of sensors together to derive the match filter; and applying the match filter to the reflections received by the first set of sensors of the first seismic streamer to compensate for the notch.

According to another embodiment, a system to perform notch compensation for a first seismic streamer includes the first seismic streamer disposed at a first depth and comprising a first set of sensors configured to receive reflections resulting from a seismic source, the reflections received by the sensors of the first seismic streamer indicating a notch at a frequency; a second seismic streamer disposed at a second depth and comprising a second set of sensors configured to receive reflections resulting from the seismic source; and a processor configured to derive a match filter based on processing the reflections received by the first set of sensors and the second set of sensors together and to apply the match filter to the reflections received by the first set of sensors of the first seismic streamer to compensate for the notch.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

As noted above, seismic streamers have sensors or receivers arranged along their length that receive reflected seismic signals. These reflections result from a source signal being transmitted into the marine environment and being reflected by reflective surfaces and features. A phenomenon that can occur is seismic energy propagating past the receivers and being reflected back down as ghost reflections. Based on water depth and the speed of sound through water, ghost reflections can be especially destructive to regular seismic reflections in certain frequencies. The vulnerable frequency increases as the depth of the seismic streamer increases. That is, shallower seismic streamers have a notch at higher frequencies than deeper seismic streamers. Embodiments of the systems and methods described herein relate to deriving a match filter by deterministically compensating the amplitude losses due to a notch frequency for the deeper streamer's sensor measurements.

Figure 1:
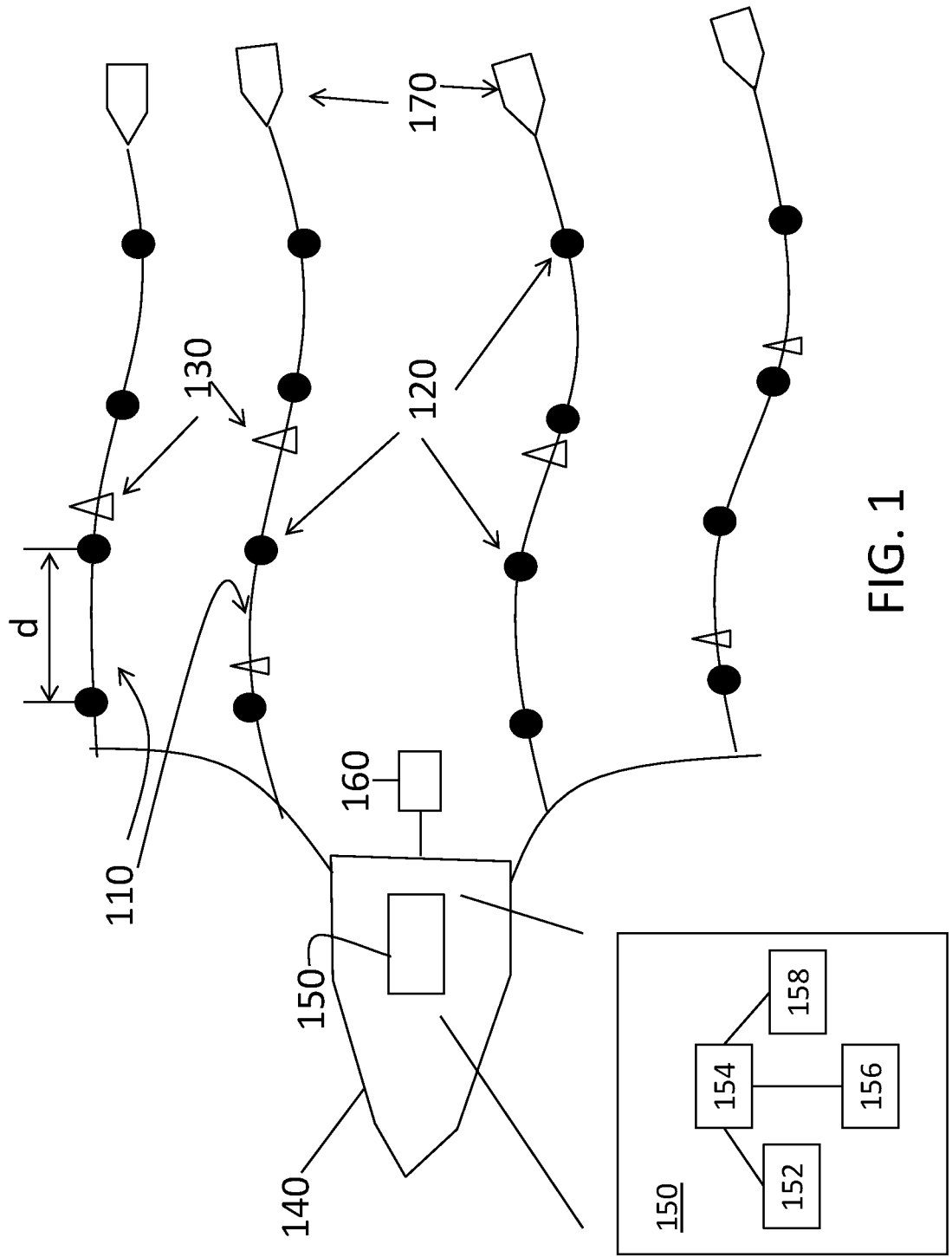
FIG. 1 is a simplified overhead view of a vessel towing a plurality of seismic streamers according to an embodiment of the invention.

FIG. 1 is a simplified overhead view of a vessel 140 towing a plurality of seismic streamers 110 according to an embodiment of the invention. The illustration in FIG. 1 is for explanatory purposes regarding the components and is not to scale. The streamers 110 (cables) include a plurality of receivers 120 (e.g., hydrophones) that receive seismic reflections resulting from one or more seismic sources 160

(e.g., gun array). Although four streamers 110 are shown in FIG. 1, one or many streamers 110 may be towed behind the vessel 140. A diverter, for example, may be used to separate the streamers 110 and spread them out behind the vessel 140. The receivers 120 may be arranged at a distance d of 12.5 meters (m) from each other, for example, and this distance may be the spacing between each adjacent pair of receivers 120. One or more magnetic compasses 130 may also be arranged along the seismic streamer 110. A buoy 170 may be arranged at the opposite end of each streamer 110 from the vessel 140 and may carry additional equipment such as a gyroscope and an accelerometer, for example. The vessel 140 carries one or more controllers 150 to control and analyze data from the one or more sources 160 and sensors (e.g., receivers 120, magnetic compasses 130). The controller 150 includes an input interface 152, one or more processors 154, one or more memory devices 156, and an output interface 158. One or more controllers 150 including one or more processors 154 may instead be located at the buoy 170 or elsewhere along the streamer system.

Figure 2:
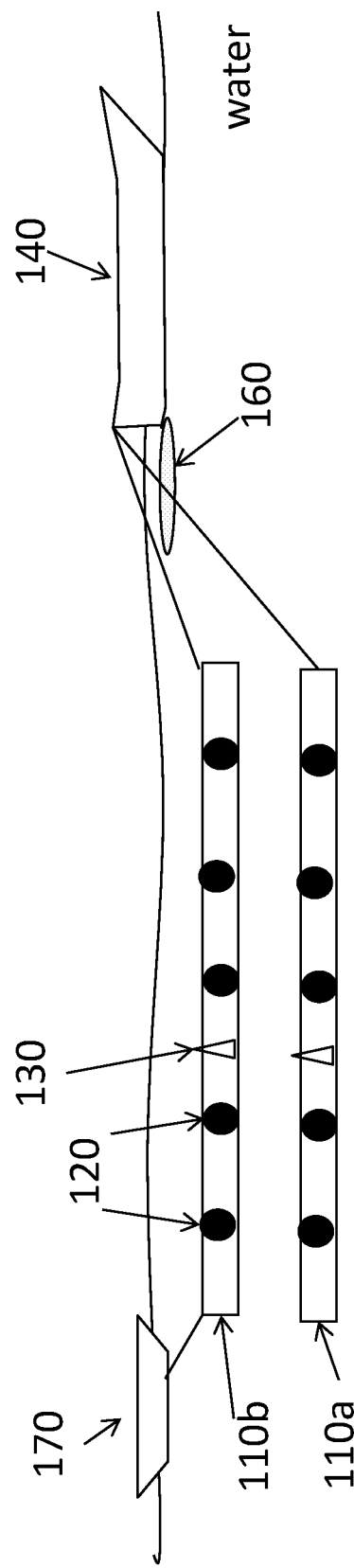
FIG. 2 is a cross-sectional side view of a seismic sampling system according to an embodiment of the invention.

FIG. 2 is a cross-sectional side view of a seismic sampling system according to an embodiment of the invention. As FIG. 2 indicates, two exemplary streamers 110a, 110b are towed at different depths. Streamer 110a may be what would be considered a conventional streamer 110. Streamer 110a may be 6 to 12 kilometers (km) long and may be towed at a depth of 20 to 25 meters. As a result, the seismic bandwidth of data from streamer 110a would include a notch. The second streamer 110b may be directly above streamer 110a and may be towed at a depth of 6 to 8 meters. The notch in the data obtained with streamer 110b would be at a much higher frequency than the notch in the data obtained with streamer 110a. The streamer 110a may be shorter than the streamer 110b. That is, the streamers 110a, 110b need not be the same length and need not comprise the same number of receivers 120.

Based on simultaneously recording both the shallow streamer 110b and deep streamer 110a data, a match filter may be derived (by a processor 154 receiving data from the streamers 110a, 110b) by matching the deeper tow streamer 110a data to the shallow tow streamer 110b data within a given data bandwidth. Only a subset of both data sets may be recorded for computation of the match filter. According to one embodiment, the recorded simultaneous data sets may be stacked (summed), respectively, to produce an average signature that automatically includes surface ghost reflections for each data set. These surface ghost reflections are always present and are what generate the data frequency notches that depend on the tow depth. As detailed below, a match filter for the ghost reflection from the deeper streamer 110a may be developed based on data collected by the shallower streamer 110b. Once the match filter is developed, the match filter may be applied to the reflections received by the deeper streamer 110a that were used to develop the match filter as well as to subsequent reflections obtained by the deeper streamer 110a to essentially increase the signal-to-noise ratio (decrease the effect of the notch) for reflections received at the notch frequency.

Derivation of the match filter is based on:

$$D*F=S \quad [EQ. 1]$$

D is the average signature of the data at the deeper towed streamer 110a, obtained by stacking data sets obtained by the deeper towed streamer 110a. F is the match filter, which is convolved with D, and S is the average signature of the data at the shallower tow depth streamer 110b, which is obtained by stacking data sets obtained (simultaneously with data sets at the deeper tow depth) by the shallower towed streamer 110b. The match filter F may be solved from EQ. 1 based on a least squares formulation, for example, or another known technique.

Figure 3:
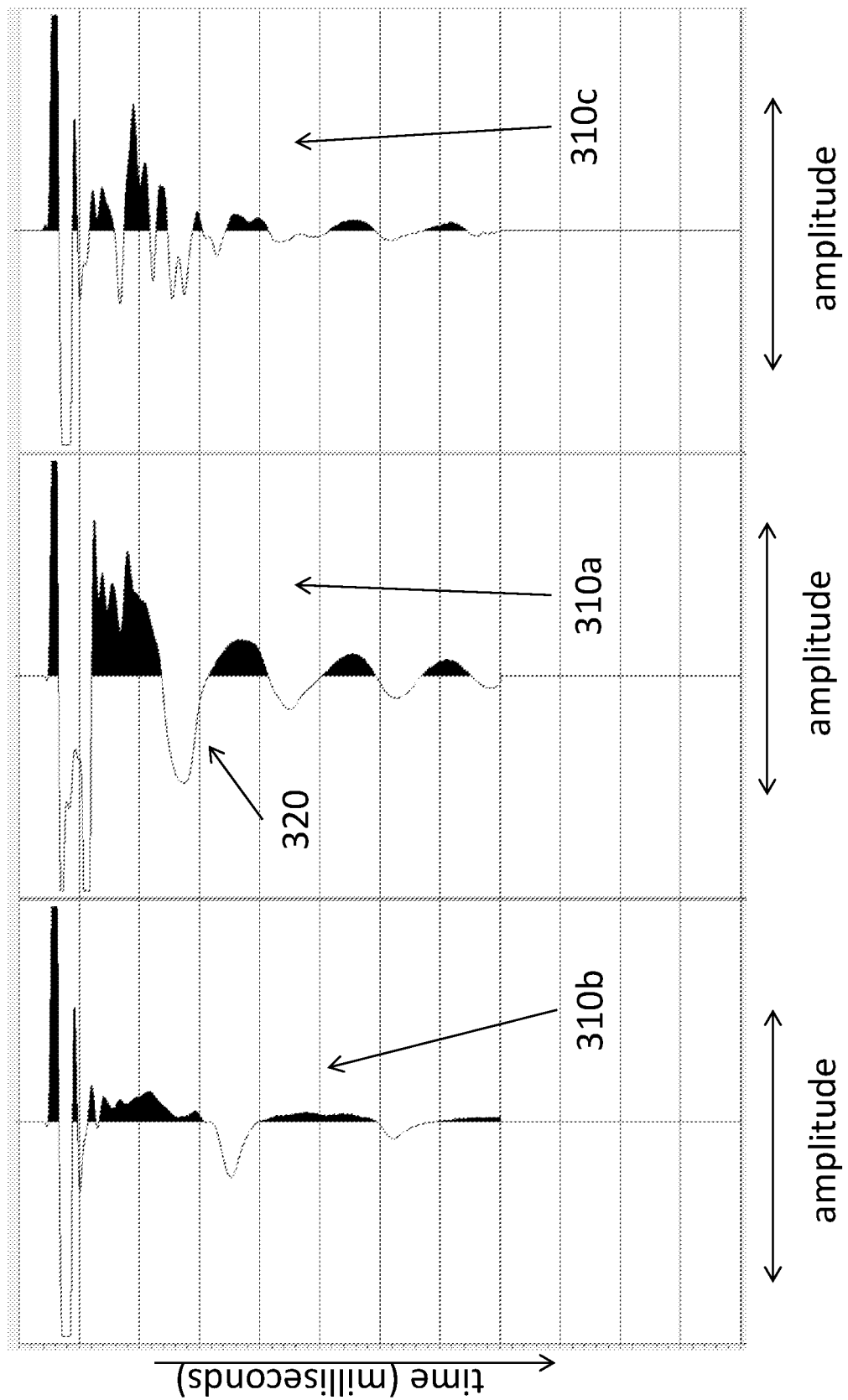
FIG. 3 exemplifies the application of the match filter to streamer data in the time domain according to an embodiment of the invention.

FIG. 3 exemplifies the application of the match filter to streamer data in the time domain according to an embodiment of the invention. Average signatures (stacked data) 310a, 310b, 310c are shown in the time domain (amplitude versus time). An average signature 310b for data obtained with the shallower tow depth streamer 110b is shown along with an average signature 310a for data obtained with the deeper tow depth streamer 110a. The average signature 310a obtained with the deeper tow depth streamer 110a indicates the notch 320. As noted above, the data used to obtain the average signature 310a and the average signature 310b may have been obtained simultaneously in order to derive a match filter according to EQ. 1. The average signature 310c after application of the match filter to the average signature 310a obtained with the deeper tow streamer 110a (after notch 320 compensation) indicates that absolute value of amplitude of the notch 320 is decreased.

Figure 4:
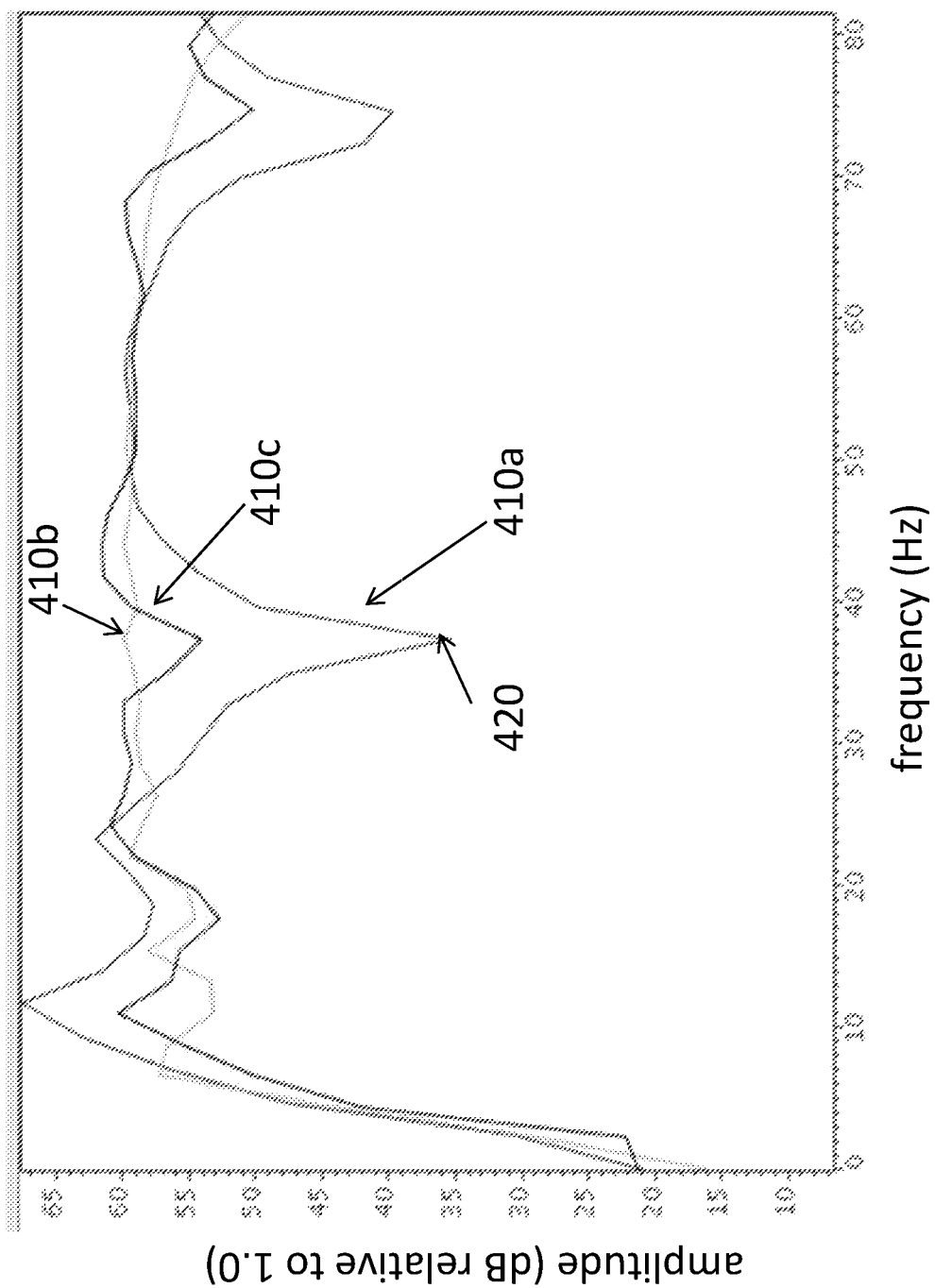
FIG. 4 exemplifies the application of the match filter to streamer data in the frequency domain according to an embodiment of the invention.

FIG. 4 exemplifies the application of the match filter to streamer data in the frequency domain according to an embodiment of the invention. Average signatures (stacked data) 410a, 410b, 410c are shown in the frequency domain (amplitude versus frequency). An average signature 410a for data obtained with the deeper tow depth streamer 110a indicates a notch 420 at approximately 38 Hertz (Hz). The average signature 410b is obtained with data collected by the shallower tow depth streamer 110b and may have been collected simultaneously with the data collected to obtain the average signature 410a such that a match filter is derived according to EQ. 1. When the match filter is applied to the average signature 410a (when notch 420 compensation is performed), the average signature 410c results. As the average signature 410c indicates, the notch 420 at approximately 38 Hz in the average signature 410a is significantly reduced though application of the match filter.

Figure 5:
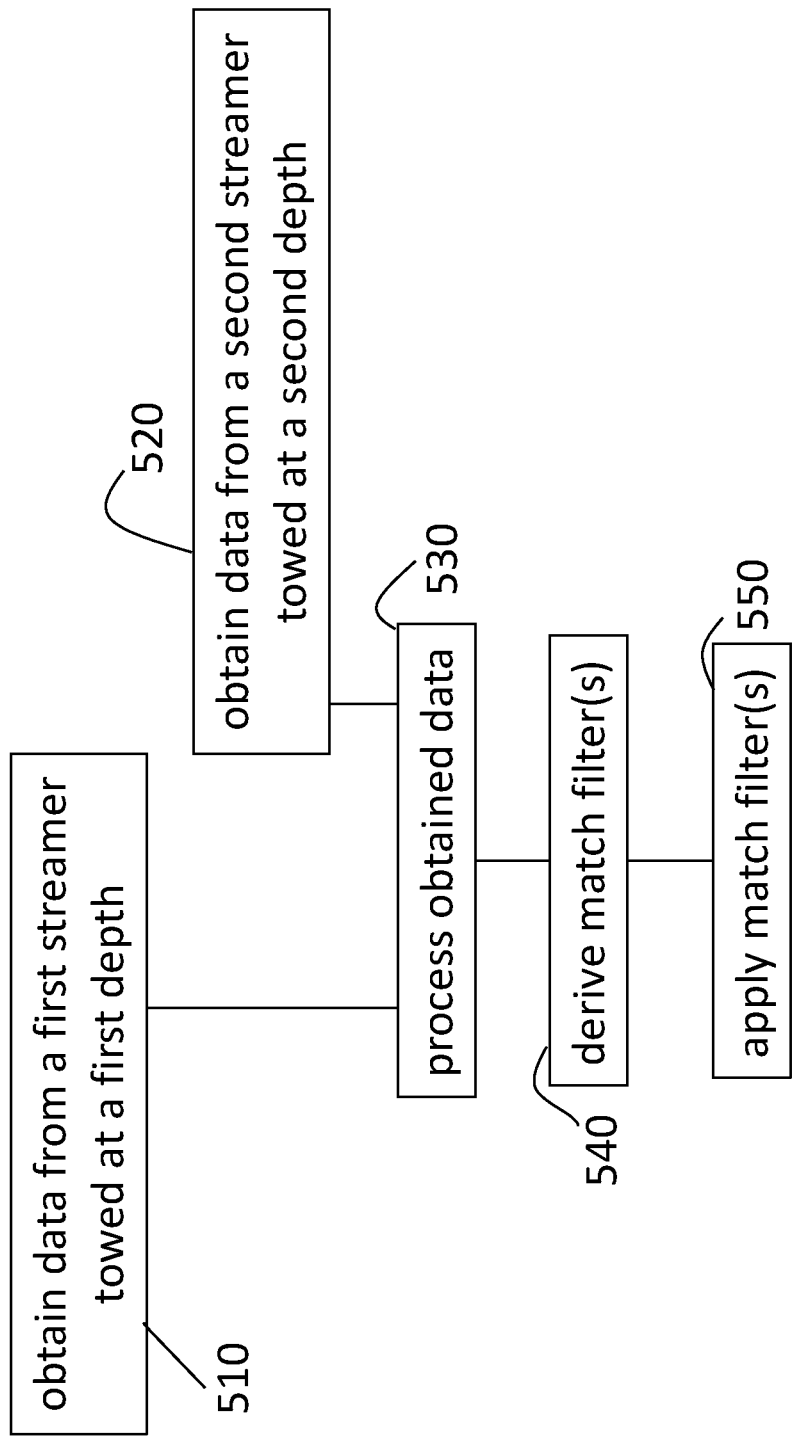
FIG. 5 is a process flow of a method of performing notch compensation according to an embodiment of the invention.

FIG. 5 is a process flow of a method of performing notch compensation according to an embodiment of the invention. Obtaining data from a first streamer (110a, 110b) towed at a first depth (deeper, shallower), at block 510, and obtaining data from a second streamer (110b, 110a) towed at a second depth (shallower, deeper), at block 520, includes obtaining seismic reflection signals resulting from one or more seismic sources 160 and may be done simultaneously. At block 530, processing the obtained data includes obtaining average signatures (310a, 310b, 410a, 410b) by stacking the respective seismic reflection signals obtained by each streamer 110a, 110b. At block 540, deriving the match filter includes using EQ. 1 and, additionally, known techniques such as, for example, least squares. Applying the match filter, at block 550, includes applying the match filter to one of the data sets obtained at blocks 510 or 520 (to the average signature 310a, 410a obtained using the deeper tow depth streamer 110a). Applying the match filter (550) also applies to subsequent reflections received by the deeper tow depth streamer 110a. This application of the match filter is referred to as notch compensation for the reflections (average signature 310a, 410a) obtained using the deeper tow depth streamer 110a.

According to an alternate embodiment, datasets obtained by the streamers 110a, 110b are first subdivided according to spatial location. Thus, processing the obtained data, at block 530, refers to processing each of the subsets to obtain average signatures. At block 540, the process includes deriving a match filter corresponding with each subset. As a result, spatially varying match filters are derived. At block 550, applying the match filters includes applying the match filter derived from a given subset of data of the shallower tow depth streamer 110b to the subset of data of the deeper tow depth streamer 110a at the same spatial location.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

What is claimed is:

1. A method of performing notch compensation for a first seismic streamer, the method comprising:
    disposing the first seismic streamer at a first depth, the seismic streamer comprising a first set of sensors configured to receive reflections resulting from a seismic source, the reflections received by the first set of sensors indicating a notch at a frequency;
    disposing a second seismic streamer at a second depth, the second depth being less than the first depth and the second seismic streamer comprising a second set of sensors configured to receive reflections resulting from the seismic source;
    subdividing a first dataset of the reflections received by the first set of sensors into first subdivisions and subdividing a second dataset of the reflections received by the second set of sensors into second subdivisions, the first subdivisions and the second subdivisions being associated with a spatial location of the first set of sensor and the second set of sensors;
    processing the reflections received by the first set of sensors and the second set of sensors together to derive a match filter corresponding with the spatial location associated with the spatial location of the sensors said match filter based on:

$$D*F=S,$$

wherein D is the average signature for the first seismic streamer, F is the match filter, and S is the average signature for the second seismic streamer; and
    applying the match filter to the reflections received by the first set of sensors of the first seismic streamer to compensate for the notch.

2. The method according to claim 1, wherein the processing the reflections received by the first set of sensors and the second set of sensors includes obtaining an average signature for each of the first seismic streamer and the second seismic streamer based on stacking the reflections received by the first set of sensors and stacking the reflections received by the second set of sensors, respectively.

3. The method according to claim 1, wherein the deriving the match filter includes solving for F based on least squares formulation.

4. The method according to claim 1, wherein the disposing the first seismic streamer includes disposing the first seismic streamer at 20 to 25 meters below a water surface.

5. The method according to claim 1, wherein the disposing the second seismic streamer includes disposing the second seismic streamer at 6 to 8 meters below a water surface.

6. The method according to claim 1, wherein the processing the reflections to derive the match filter includes processing the first subdivisions and the second subdivisions to derive spatially diverse match filters, each spatially diverse match filter corresponding with the spatial location associated with one set of the first subdivisions and the second subdivisions.

7. A system to perform notch compensation for a first seismic streamer, the system comprising:
    the first seismic streamer disposed at a first depth and comprising a first set of sensors configured to receive reflections resulting from a seismic source, the reflections received by the sensors of the first seismic streamer indicating a notch at a frequency;
    a second seismic streamer disposed at a second depth and comprising a second set of sensors configured to receive reflections resulting from the seismic source; and
    a processor configured to derive a match filter based on processing the reflections received by the first set of sensors and the second set of sensors together and to apply the match filter to the reflections received by the first set of sensors of the first seismic streamer to compensate for the notch,
    wherein the processing the reflections received by the first set of sensors and the second set of sensors includes subdividing a first dataset of the reflections received by the first set of sensors into first subdivisions and subdividing a second dataset of the reflections received by the second set of sensors into second subdivisions, the first subdivisions and the second subdivisions being associated with a spatial location of the first set of sensor and the second set of sensors,
    where the match filter corresponds with the spatial location associated with the spatial location of the sensors said match filter based on:

$$D*F=S,$$

wherein D is the average signature for the first seismic streamer, F is the match filter, and S is the average signature for the second seismic streamer.

8. The system according to claim 7, wherein a length of the first seismic streamer is longer than a length of the second seismic streamer.

9. The system according to claim 7, wherein a number of the first set of sensors is more than a number of the second set of sensors.

10. The system according to claim 7, wherein the first set of sensors and the second set of sensors are geophones or hydrophones.

11. The system according to claim 7, wherein the processor obtains an average signature for each of the first seismic streamer and the second seismic streamer based on stacking the reflections received by the first set of sensors and stacking the reflections received by the second set of sensors, respectively.

12. The system according to claim 7, wherein the processor derives the match filter by solving for F based on least squares formulation.

13. The system according to claim 7, wherein the first seismic streamer is disposed at 20 to 25 meters below a water surface.

14. The system according to claim 7, wherein the second seismic streamer is disposed at 6 to 8 meters below a water surface.

15. The system according to claim 7, wherein the processor derives a set of spatially diverse match filters, each spatially diverse match filter corresponding with the spatial locations associated with one set of the first subdivisions and the second subdivisions.

16. The system according to claim 15, wherein the processor applies a spatially diverse match filter among the set of spatially diverse match filters corresponding with a spatial location associated with the first set of sensors to the reflections received by the first set of sensors to compensate for the notch.

\* \* \* \* \*